(12) United States Patent  
Burnett

(10) Patent No.: US 6,931,775 B2
(45) Date of Patent: Aug. 23, 2005

(54) REMOTE CONTROL MODULE FOR A VEHICLE

(75) Inventor: Edward L. Burnett, Ventura, CA (US)

(73) Assignee: Lockheed Martin Corporation, Bethesda, MD (US)

(*) Notice: Subject to any disclaimer, the term of this patent is extended or adjusted under 35 U.S.C. 154(b) by 244 days.

(21) Appl. No.: 10/162,372

(22) Filed: Jun. 5, 2002

(65) Prior Publication Data

US 2003/0226305 A1 Dec. 11, 2003

(51) Int. Cl.[7] ............................................. F41C 23/00
(52) U.S. Cl. .............................. 42/72; 42/71.01; 42/90; 42/106; 89/1.11
(58) Field of Search ......................... 42/90, 71.01, 72, 42/106; 89/1.42, 1.11, 1.1

(56) References Cited

U.S. PATENT DOCUMENTS

| | | | | |
|---|---|---|---|---|
| 3,868,883 A | * | 3/1975 | Tucker ........................... 89/1.8 |
| 3,912,197 A | * | 10/1975 | McKown et al. ........... 244/3.13 |
| 3,974,984 A | * | 8/1976 | Dobson et al. ............. 244/3.11 |
| 4,008,478 A | * | 2/1977 | Ikrath et al. ................. 343/720 |
| 4,666,103 A | * | 5/1987 | Allen ........................... 244/3.11 |
| 4,725,956 A | * | 2/1988 | Jenkins ........................... 701/2 |
| 4,852,457 A | * | 8/1989 | Schlegel et al. ............... 89/6.5 |
| 5,044,107 A | * | 9/1991 | Holford ......................... 42/132 |
| 5,106,033 A | * | 4/1992 | Phan .......................... 244/3.12 |
| 5,198,600 A | * | 3/1993 | E'Nama ........................ 42/90 |
| 5,555,662 A | * | 9/1996 | Teetzel ......................... 42/115 |
| 5,682,137 A | * | 10/1997 | Li ............................... 340/467 |
| 5,822,905 A | * | 10/1998 | Teetzel ......................... 42/117 |
| 5,824,942 A | * | 10/1998 | Mladjan et al. ............. 89/41.17 |
| 6,192,614 B1 | * | 2/2001 | Cliburn ........................ 42/106 |
| 6,250,194 B1 | * | 6/2001 | Brandl et al. ................ 89/1.41 |
| 6,422,507 B1 | * | 7/2002 | Lipeles ....................... 244/3.13 |
| 6,569,019 B2 | * | 5/2003 | Cochran ...................... 463/37 |

* cited by examiner

Primary Examiner—M. Clement
(74) Attorney, Agent, or Firm—Koestner Bertani LLP; Mary Jo Bertani

(57) ABSTRACT

The invention is a remote control module for controlling the movement of a vehicle, the module for mounting on a rifle. The module includes a housing suitable for use as a forward handgrip for the rifle. A mechanism is included to mount the housing on the rifle in the location of the forward handgrip. An electronic control circuit for controlling the movement of the vehicle is mounted within the housing. Vehicle control devices are mounted on one side or both of the housing coupled to the electronic control circuit such that the operator of the module can simultaneously operate the rifle and control the motion of the vehicle.

11 Claims, 5 Drawing Sheets

REMOTE CONTROL MODULE FOR A VEHICLE

BACKGROUND OF THE INVENTION

1. Field of the Invention

The invention relates to the field of remote control modules for controlling vehicles such as small unmanned reconnaissance aircraft and the like and, in particular, to a remote control module that is mountable on a rifle or the like such that the operator can carry on other actions along with controlling the vehicle. The invention also can be used to control wire guided missiles and the like.

2. Description of Related Art

The typical control module for controlling a small-unmanned aircraft or automobile is mounted in a hand held box. The box typically includes one or more "joysticks" and buttons, etc. The operator holds the box with one hand and operates the joystick with the other hand. When possible the box is placed on a support leaving both hands free to operate the controls. Another approach is hold the control box with fingers and palm of the hand and use the thumb to operate the joystick. Regardless of the method used, the operator is generally unable to simultaneously handle other tasks.

The problem of handling duel tasks has been addressed. For example, on certain helicopter gunships, the pilot, wearing a special helmet, can aim a remotely mounted machine gun by moving his or her head, leaving their hands free to fly the vehicle. The gun is fired by means of a trigger mounted on the control column. This concept is being expanded to include the control of a missile.

However, on the battlefield where troops may under fire, or at least under the threat of hostile fire, the individual soldier must be ready to use his or her rifle at all times. The use of a rifle requires that the soldier place the butt against his or her shoulder, have one hand on the trigger and trigger grip and the other hand on a forward handgrip, typically a plastic or wood mounted to the barrel. Thus a soldier using the typical remote control module for a reconnaissance type micro-sized aircraft, which typically requires both hands to use. This would have the soldier to "shoulder" the weapon or place it on the ground or hand it to a companion to hold. If the soldier then came under enemy fire, he would have to store, drop or place the remote control module on the ground and bring the rifle to the firing position. In combat, such a delay could be fatal. This would be a greater problem if the soldier was on the move during a patrol or the like.

Thus, it is a primary object of the invention to provide a control module for a vehicle.

It is another primary object of the invention to provide a control module for a vehicle that allows a soldier under battlefield conditions to operate the control module while having his rifle ready for instantaneous use.

It is a further object of the invention to provide a control module for a vehicle that allows a soldier under battlefield conditions to operate the control module with one hand on the trigger of his rifle and the other on the front stock, thus having his rifle ready for instantaneous use.

It is a still further object of the invention to provide a control module for a remotely controlled vehicle that is integrated with a rifle eliminating the need for a solder to carry a separate control module.

SUMMARY OF THE INVENTION

The invention is a control module for controlling the movement of a vehicle, the module for mounting on a rifle.

In detail, the module includes a housing suitable for use as a forward handgrip for the rifle. A fastener system is used to mount the housing on the rifle in the location of the forward handgrip. Preferably, the same fastener system is one used to mount the as original handgrip is used to attach the module. The module includes an electronic control circuit for controlling the movement of the vehicle, which is mounted within the housing. Vehicle control devices, such as a ball tracking devices, on/off switches, are mounted on a first side of the housing, which are coupled to the electronic control circuit. Thus the operator of the module can simultaneously operate the rifle and control the motion of the vehicle and, if necessary immediately have use of the rifle.

If the vehicle includes a video camera or otherwise transmits information, a flat panel display screen is mountable on the second side of the housing movable from a stored position flush against the second side of the housing to a viewing position extending perpendicular therefrom. In addition, if the module transmits directly to the vehicle, an antenna is mounted on the housing coupled to the electronic circuit. If the vehicle is wire guided via a wire dispensing system, the module includes an electrical connector mounted on the housing for coupling the electronic control circuit to the wire dispensing system.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
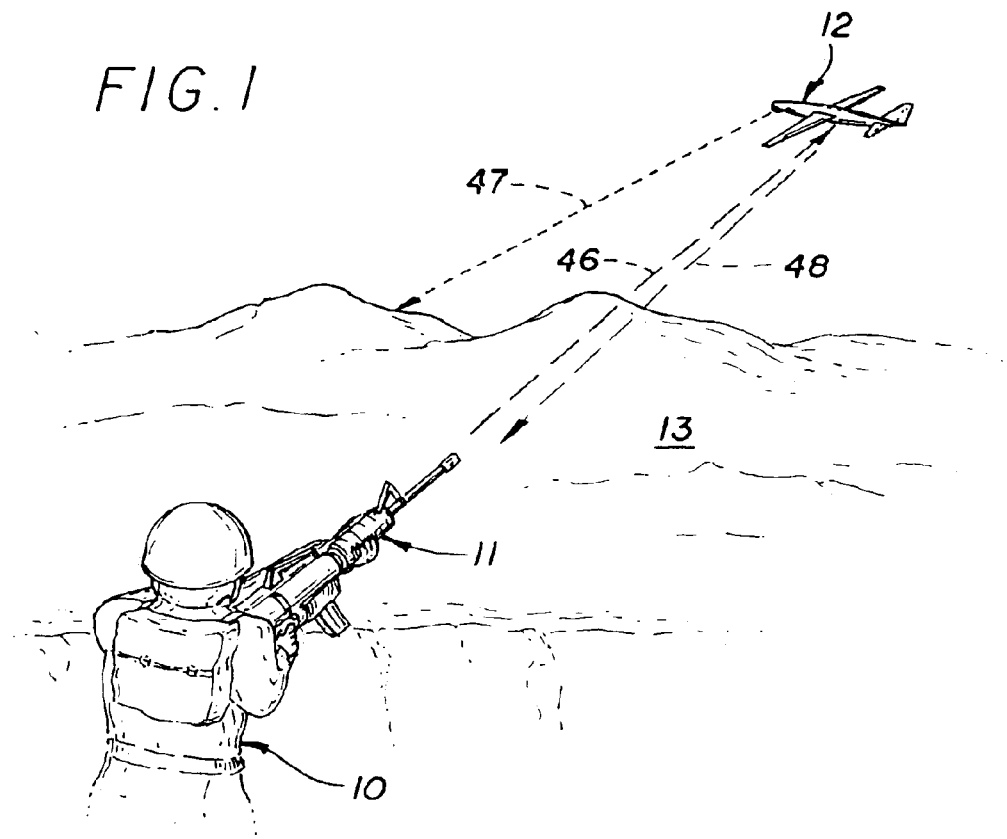
FIG. 1 is view of soldier holding a rifle with the module mounted thereon controlling an aircraft in flight.
Figure 2:
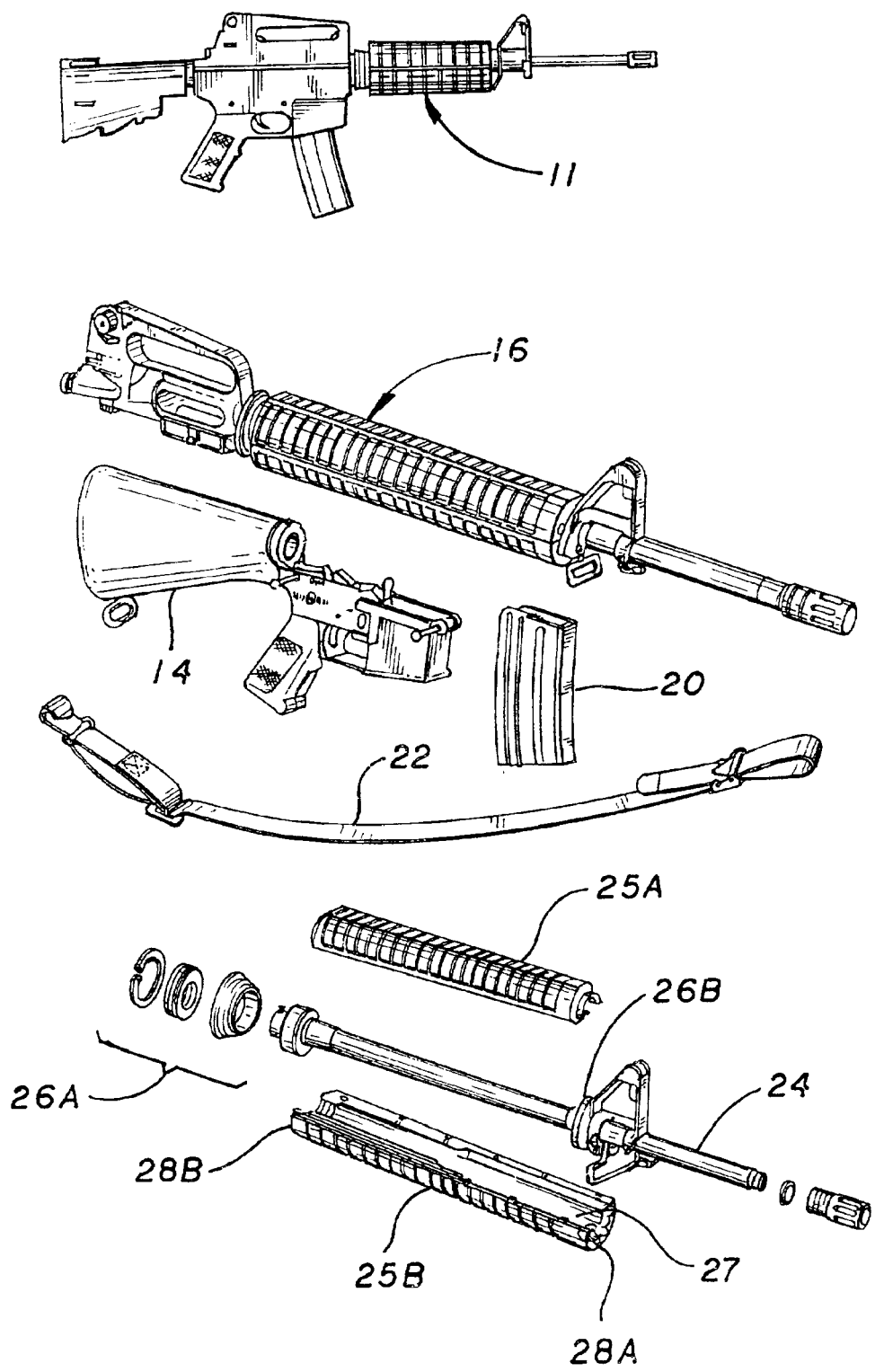
FIG. 2 is a side view of a prior art M-4 carbine rifle and in various states of disassembly.
Figure 3:
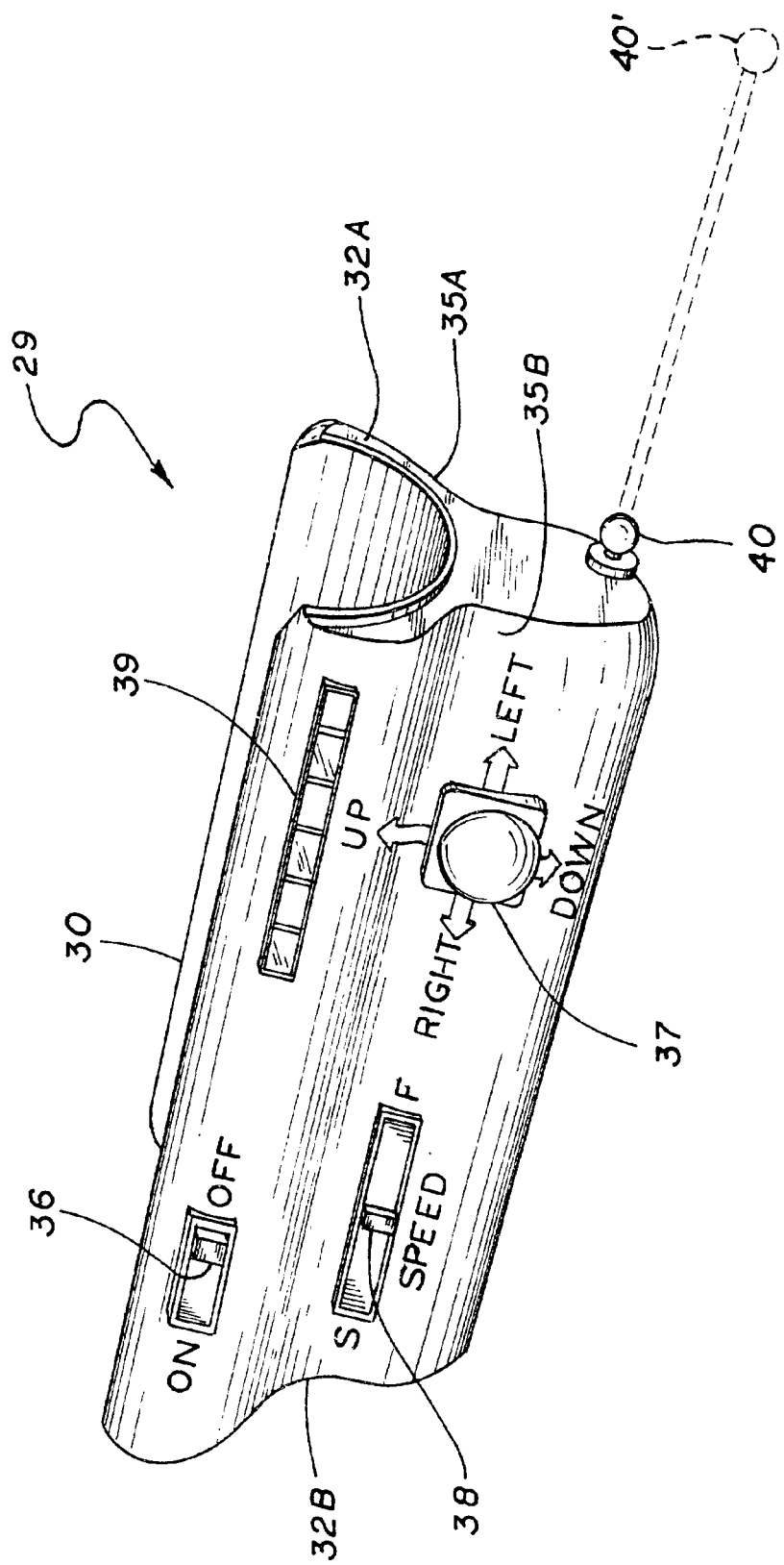
FIG. 3 is a perspective view of a first side of the module for controlling the vehicle.

Referring to FIG. 1 a soldier 10 is shown holing a M-4 rifle 11, while a small battery powered reconnaissance aircraft 12 is shown flying over a hill 13. Referring to FIGS. 2 and 3, wherein a M-4 rifle is illustrated, the rifle 11 includes a receiver assembly and buttstock 14, upper receiver and barrel assembly 16, magazine 20 and sling 22. The barrel assembly 16 further breaks down into barrel 24, upper and lower forward handgrips 25A and 25B and retainer assemblies 26A and 26B. Other rifle designs can be "field stripped" in a similar manner. The lower front handgrip 25B includes a channel 27 for barrel 24 and front and rear ends 28A and 28B. The subject invention is a replacement for or an addition to the conventional lower front handgrip 25B.

Figure 4:
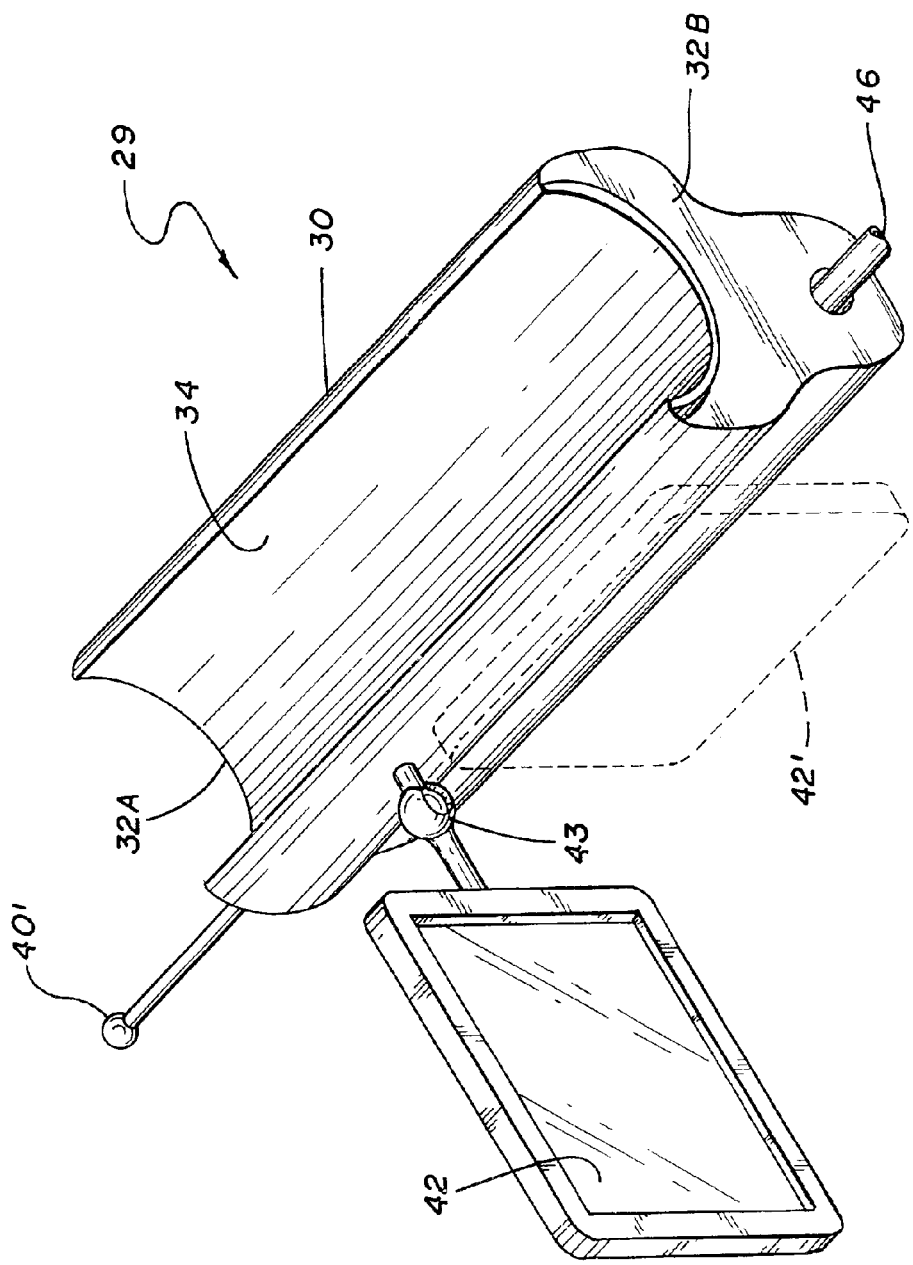
FIG. 4 is a second perspective view of the second side of the module for controlling the vehicle.

Referring to FIGS. 3 and 4, the remote control module, generally designated by numeral 29, includes a lower front handgrip 30 designed to replace lower front hand grip 25B on the rifle 11. The handgrip 30 includes front and rear ends 32A and 32B, identical to the ends 28A and 28B of lower handgrip 25B of the original M-4 rifle. A channel 34 is included, identical to channel 26 of lower front handgrip 25B, and right and left sides 35A and 35B. As illustrated, it is designed for use with an individual that grips the handgrip 30 with the left hand. Thus the remote control function switches and etc are located on the right side 35A. These may include: on/off switch 36; flight path roller ball type control device 37 for controlling movement of the vehicle; speed control sliding switch 38; and aircraft power level remaining indicator 39. Other control function switches and knobs, etc. may be incorporated as required. An antenna 40, extendable to the position indicated by numeral 40', is mounted on front end 32A for communicating with the vehicle 12. Because the module 29 is designed for use with the vehicle 12, a Video screen 42 is mounted on the left side 35B of the lower handgrip 29 by hinge means of assembly 43. The video screen 42 is movable from the extended position shown to a retracted position, indicated in dotted lines and numeral 42'. However, the video screen 42 is optional and not always required. All these components are electrically connect to an electronic control circuit 44 mounted within the lower handgrip 30 by electrical lines (not shown).

Referring to FIGS. 1–3, with the module 29 installed on the rifle 11, the soldier 10, can guide and monitor the vehicle 12, while still maintaining the rifle in a position to defend his or herself. Control signals, indicated by dotted lines 46, transmitted by the antenna 42' to the vehicle 12. Sensors, such as a video camera (not shown), mounted in the vehicle 12 detect a target over the hill 13, indicated by dotted lines 47. The vehicle 12 transmits signals also indicted by dotted lines 48 back to module 29 where video pictures are displayed on the video screen 42.

The use of the roller ball device 36 will allow precise positioning of vehicle 12. If at any point in time, the soldier 10 is attacked, he or she will be able to immediately take appropriate action. In the past, the soldier 10 would of had to place the rifle on the ground or sling it over his or her back and hold a control module with both hands. Thus the soldier would be in no condition to take offensive or defensive action if attacked. Furthermore, with this module 29 installed on the rifle, no special vehicle control equipment need be carried.

Figure 6:
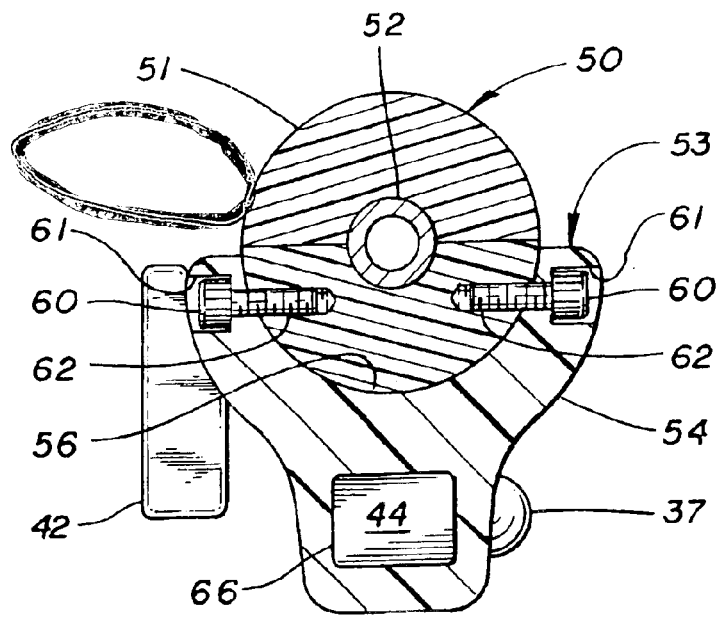
FIG. 6 is a cross-sectional view of FIG. 5 taken along the line 5—5 illustrating the mounting of the module on a rifle.
Figure 5:
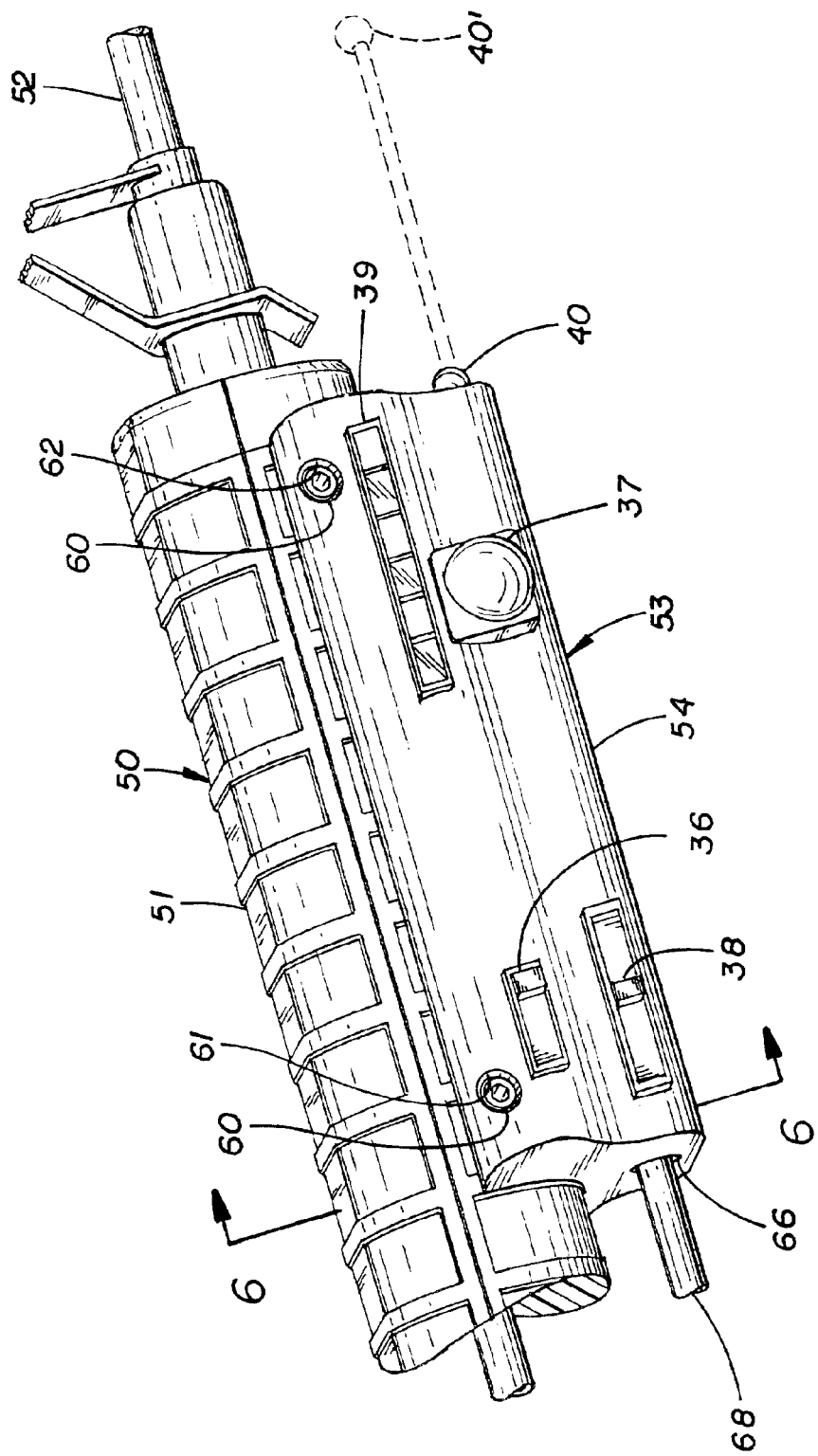
FIG. 5 is a perspective view of a second embodiment of the module installed on a rifle.

Illustrated in FIGS. 5 and 6 is an alternate design for the remote control module shown attached t a rifle 50 with a forward handgrip 51 extending about the barrel 52, with the module indicated by numeral 53. The module 53 includes a housing 54 having a recess 56 that mates wit the forward handgrip 51 of the rifle 50. It is attached to the existing forward handgrip 51 by means of four fastener assemblies 60 that extend through counter sunk holes 61 in e housing 54 and into threaded holes 62 in the handgrip 51, respectively. The module 53 also includes on/off switch 36, flight path roller ball type control device 37 for controlling movement of vehicle, speed control sliding switch 38, indicator 39, antenna 40, and video screen 42, all connected to an electronic control circuit 44. Other control function switches and knobs, etc. may be incorporated as required. However, an electrical connector 66 is a so incorporated that is shown connected to cable 68 that could connect in turn to a wire guided missile launcher (not shown) or other system. Thus the module could be use to guide o her types of vehicles.

In summary, it has been demonstrated that the control module allows the soldier to control a remotely controlled vehicle. The vehicle could be an aircraft, ground vehicle or wire guided missile, to name a few. The soldier also can remain ready to immediately use his rifle, if he or she comes under attack. In addition, a separate control module is no longer necessary.

While the invention has been described with reference to a particular embodiment, it should be understood that the embodiment is merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to industries involved in the manufacture of control modules for small remotely controlled vehicles.

What is claimed is:

1. An apparatus for controlling and monitoring the movement of a remote vehicle, comprising:
    a remote control module operable to generate control signals to be transmitted to the vehicle, the module being mountable on a rifle, the module comprising:
    a housing configured as a hand grip for the rifle;
    an electronic control circuit mounted within the housing;
    a vehicle control device coupled to the electronic control circuit and mounted on the housing such that the operator of the module can simultaneously operate the rifle and control the vehicle; and
    a communication link operable to transmit signals to the vehicle and to receive signals generated by the vehicle.

2. The apparatus as set forth in claim 1 further comprising a display screen mounted on the housing and movable from a stored position to a viewing position.

3. The apparatus as set forth in claim 1 further comprising:
    an antenna mounted on the-apparatus, wherein the antenna is operable to transmit signals between the vehicle and the remote control module.

4. The apparatus as set forth in claim 3 comprising a laser designator mounted on the-housing and coupled to the-electronic control circuit.

5. The apparatus as set forth in claim 3 wherein the communication link between the module and the vehicle is operable to transmit guidance information to the vehicle.

6. The apparatus as set forth in claim 1 further comprising:
    a rifle; and
    a fastener for mounting the remote control module to the rifle.

7. The apparatus as set forth in claim 1, wherein the signals from the vehicle include video signals representing images from a sensor on the vehicle.

8. The apparatus as set forth in claim 1, wherein the operator can control the speed and direction of the vehicle via the vehicle control device.

9. The apparatus as set forth in claim 1 further comprising a power indicator to indicate the power remaining for the vehicle.

10. The apparatus as set forth in claim 1 wherein the communication link between the module and the vehicle is further used for transmitting video signals from the vehicle to the module.

11. The apparatus as set forth in claim 1 wherein the vehicle is wire guide via a wire dispensing system, and the electronic control circuit is coupled to the wire dispensing system.

* * * * *